(12) United States Patent
Smith et al.

(10) Patent No.: US 9,146,441 B2
(45) Date of Patent: Sep. 29, 2015

(54) APPARATUS AND METHOD FOR A SYMMETRIC SEQUENTIAL ENTANGLER OF PERIODIC PHOTONS IN A SINGLE INPUT AND OUTPUT MODE

(71) Applicant: UNITED STATES AIR FORCE, Rome, NY (US)

(72) Inventors: Amos M. Smith, Rome, NY (US); Michael L Fanto, Rome, NY (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 14/022,272

(22) Filed: Sep. 10, 2013

(65) Prior Publication Data

US 2015/0029569 A1   Jan. 29, 2015

Related U.S. Application Data

(60) Provisional application No. 61/857,710, filed on Jul. 24, 2013.

(51) Int. Cl.

| | | |
|---|---|---|
| *G02B 6/12* | (2006.01) | |
| *G02F 1/225* | (2006.01) | |
| *G06N 99/00* | (2010.01) | |
| *B82Y 20/00* | (2011.01) | |
| *H04L 9/08* | (2006.01) | |
| *H04B 10/70* | (2013.01) | |
| *G02F 1/21* | (2006.01) | |

(52) U.S. Cl.
CPC ............. *G02F 1/225* (2013.01); *G06N 99/002* (2013.01); *B82Y 20/00* (2013.01); *G02F 2001/212* (2013.01); *G02F 2201/20* (2013.01); *H04B 10/70* (2013.01); *H04L 9/0852* (2013.01); *Y10S 977/933* (2013.01)

(58) Field of Classification Search
None
See application file for complete search history.

(56) References Cited

U.S. PATENT DOCUMENTS

| | | | |
|---|---|---|---|
| 2003/0128923 A1* | 7/2003 | Takiguchi et al. | 385/27 |
| 2008/0031566 A1* | 2/2008 | Matsubara et al. | 385/14 |
| 2008/0310000 A1* | 12/2008 | Beausoleil et al. | 359/108 |
| 2009/0103736 A1* | 4/2009 | Pacher et al. | 380/278 |
| 2014/0126030 A1* | 5/2014 | Crespi et al. | 359/108 |
| 2014/0218747 A1* | 8/2014 | Wong et al. | 356/491 |
| 2015/0029568 A1* | 1/2015 | Smith et al. | 359/107 |

OTHER PUBLICATIONS

M.G. Thompson et al. Integrated waveguide circuits for optical quantum computing. IET Circuits, Devices & Systems, 5:2:94-102, Mar. 2011.*

* cited by examiner

*Primary Examiner* — Mike Stahl
(74) *Attorney, Agent, or Firm* — Joseph A Mancini

(57) ABSTRACT

An apparatus providing an integrated waveguide device that creates entanglement between a symmetrical sequence of periodically spaced (in time) photons in a single input and output mode. The invention comprises a polarization maintaining integrated waveguide chip containing a number of delay lines, integrated multimode interferometers with the potential for rapid switching, a polarization controller and off chip computer logic and timing.

9 Claims, 1 Drawing Sheet

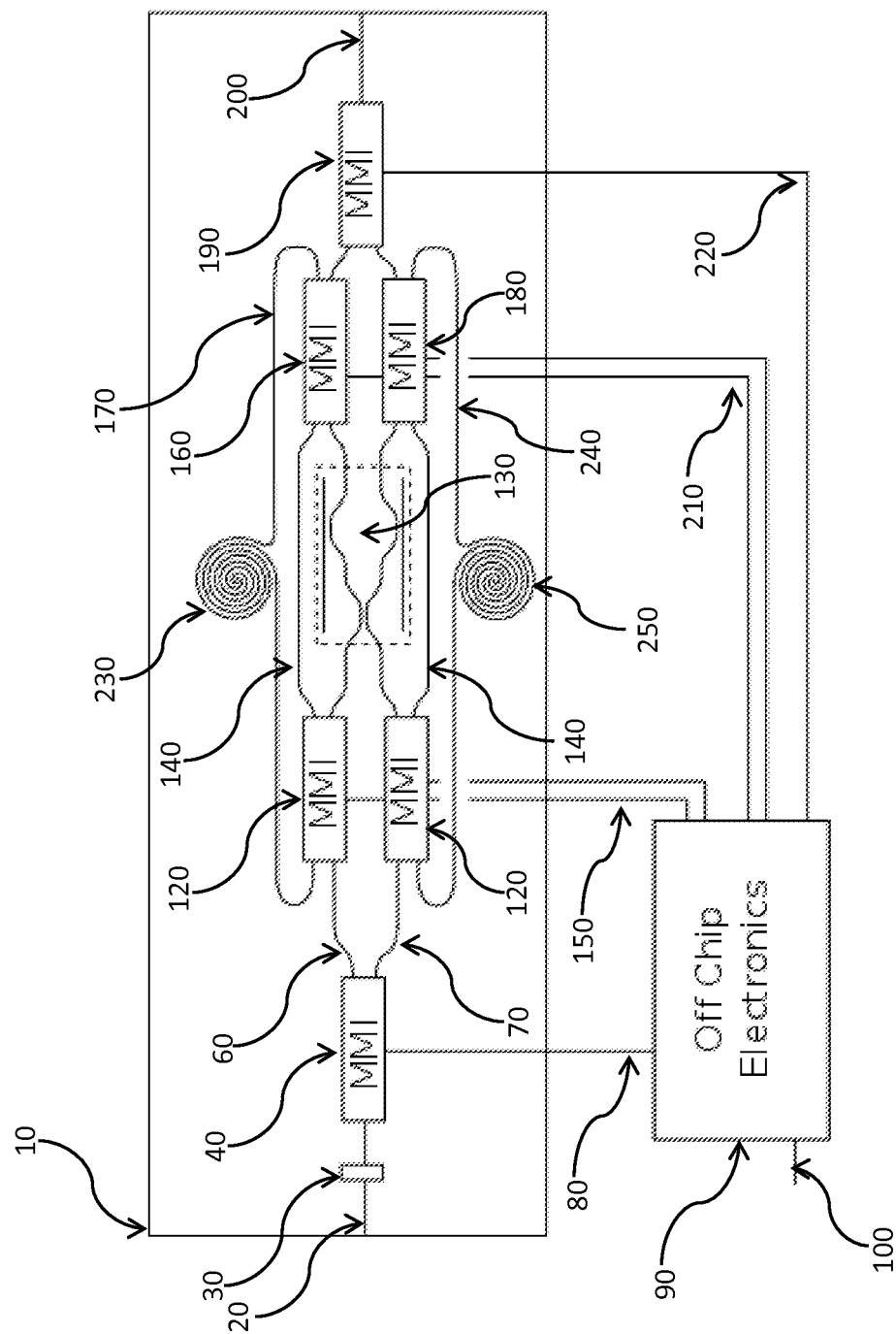

APPARATUS AND METHOD FOR A SYMMETRIC SEQUENTIAL ENTANGLER OF PERIODIC PHOTONS IN A SINGLE INPUT AND OUTPUT MODE

PRIORITY CLAIM UNDER 35 U.S.C. §119(e)

This patent application claims the priority benefit of the filing date of provisional application Ser. No. 61/857,710, having been filed in the United States Patent and Trademark Office on Jul. 24, 2013 and now incorporated by reference herein.

STATEMENT OF GOVERNMENT INTEREST

The invention described herein may be manufactured and used by or for the Government for governmental purposes without the payment of any royalty thereon.

BACKGROUND OF THE INVENTION

A cluster state can be loosely defined as an entangled set of qubits arranged in a lattice. Breigel and Raussendorf strictly define a cluster state as "Let each lattice site be specified by a d-tuple of (positive or negative) integers a $\epsilon Z^d$. Each sight has 2 d neighboring sites. If occupied, they interact with the qubit a". This implies a cluster state has interaction between all nearest neighbor qubits. In one dimension (d=1) this results in a linear chain of qubits, of arbitrary length with each qubit entangled with both of its nearest neighbors. All of the internal qubits will have two interactions while the edge qubits will have one. Such a one dimensional nearest neighbor cluster state has been shown to be amenable to several applications for computation presuming the cluster state is "long enough".

Traditional generation of a cluster state consists of an optical table several meters on each side. On this table is a high power laser system such as a pulsed Ti:Sapphire laser. The pump beam is incident on a nonlinear material such as BBO, BiBO or PPKTP etc. The photons from the pump then have a small chance to undergo industry standard Spontaneous Nonlinear Parametric Down Conversion (SPDC) to create an entangled pair of photons, called signal and idler photons. Alternative means of photon generation are equally valid such as but not limited to four wave mixing (FWM). To create larger cluster states the pump passes through multiple nonlinear materials (a cascade configuration) or is reflected back onto the original material (a multi-pass configuration). These methods can create multiple simultaneous independent pairs of qubits. To create one large cluster state the pairs are sent through (i.e. acted on by) an entangling operation. Normally the industry standard two qubit entangling gate controlled phase gate (CPhase) or controlled Z gate (CZ) is used. The simplest and most efficient means of implementing the general CZ gate requires 3 bulk optical asymmetric beam splitters in a specific alignment. These operations are effectively performed in parallel with each qubit entering and exiting in its own mode. Once all the entangling operations are successfully completed the cluster state is fully constructed and an algorithm can be implemented as a sequence of single qubit rotations and measurements on each qubit in a predetermined sequence. Thus in the state of the art, linear cluster states are created from simultaneously generated qubits in parallel modes rather than from sequential qubits in a single mode. This is mainly due to the spontaneous nature of single photon sources. It is impossible to predict the time between two subsequent spontaneous events.

The present invention builds upon the periodic photons source of Mower and Englund (WO2013009946A1) to create entanglement between sequential separable qubits delivered in a single mode and create a linear cluster state of sequential qubits which is output in a single mode. Such a device is of interest in and of itself for quantum computing. Applications include but are not limited to Measurement Based Quantum Computing (MBQC) implementation of the Deutsch-Jozsa algorithm on a four qubit chain, arbitrary single qubit rotations on a four qubit chain, quantum key distribution, quantum information, quantum metrology and quantum lithography.

OBJECTS AND SUMMARY OF THE INVENTION

Briefly stated, the present invention (the Sequential Entangler or S.E.) combines reconfigurable optical Integrated Waveguides (IW) with a periodic photon input to create linear cluster states in a single mode.

The present invention creates the entanglement of sequential qubits by using a unique "loop back" architecture that delays one photon for one period T of the sequence thus allowing for two photons to be acted on by a standard entangling element; which, in the present invention uses the simple polarization encoded CZ gate of Crespi et. al (WO2012150568A1). After the CZ gate one photon (now entangled so which cannot be distinguished) is then released and the second is looped back to coincide with the arrival of the next photon and so on. This will probabilistically produce a linear cluster state. The term probabilistically as the state of the art CZ gate has a one in nine (⅑) success rate. Thus the longer a desired cluster state is the less likely it is to be created in any one attempt. This is a result of the entangling operation and not the S.E. per say as no photonic entangling operation can be performed with unit success. The present invention will create a cluster state numerically identical to the industry standard parallel method but arranges the qubits as a periodic sequence (with a constant period T) in a single optical mode. Any two qubit entangling operation can be used in place of the CZ however such gates may produce different cluster states.

BRIEF DESCRIPTION OF THE DRAWINGS

It is noted that all figures are schematic and are said to be "not to scale".

FIG. 1 depicts the preferred embodiment of the present invention, i.e., full reconfigurable monolithic integrated waveguide based Symmetrical Sequential Entangler (S.E.) with one input mode and one output mode with labeled features.

DETAILED DESCRIPTION OF THE PREFERRED EMBODIMENT

A sequence of periodic photons created by any means enter the integrated waveguide chip 10 in FIG. 1 via the input port 20, The integrated waveguide may be made from any of a number of materials. In our preferred embodiment we will use Lithium Niobate ($LiNbO_3$) as the waveguide material. The input port 20 is a polarization maintaining optical waveguide fabricated in the $LiNbO_3$ chip 10. Polarization maintaining waveguides are required as we chose to encode our qubits in the polarization modes of each photon. Thus the resource of periodic photons must also be in a known polarization state. It is then trivial to rotate the input state polarization state to any desired state via a polarization controller 30. The preferred embodiment of the present invention uses integrated waveguide based polarization controllers 30 which function via the electro-optical effect. The preferred embodiment of the present invention utilizes the Pockels effect which is innate to lithium niobate. Such rotations could take place prior to the photons entering the chip but for generality and controllability we rotate the polarizations on chip. In the preferred embodiment the invention rotates the incoming photons at 30 to the plus state (equal superposition of horizontal and vertical polarization, H+V up to normalizations). The photons then enter the first of several multimode interferometers (MMI) 40. All such interferometers are integrated on chip 10 and consist of a multimode slab of the waveguide material similar to that described by Soldano and Pennings (J. of Lightwave Tech. Vol. 13 No. 4, 1995). The switching and coupling effect of such MMI's 40 is depended on their geometry and the index change induced via the electro-optic effect. The fabrication and operation of MMIs is well known in the state of the art. In the preferred embodiment the MMIs act as high speed spatial mode switches that route photons from a specific input mode to a specific output mode. In the preferred embodiment there are several species of MMIs (such as 1 by 2, 2 by 2 and 2 by 1 MMIs in terms of the number of input and output modes) however it is noted that the device could be trivially redesigned with a single species of 2×2 MMI in which unused ports are bulk terminated. MMI 40 switches input photons from mode 20 to modes 60 or 70. In other words the MMI 40 will be controllable such that a photon entering in input mode 20 can be deterministically routed to either waveguide 60 or 70. Such MMI switches are well known in the state of the art. The control element is therefore shown as a logical connection 80 and its setting is determined by off chip electronics 90. To achieve proper synchronization with the periodic input source a clock signal 100 must be sent to the device. In the preferred embodiment the high speed electro-optical effect (>40 GHz) is used to modify the index within each of the MMI.

Now two photons which were sequential in time are now synchronized in time on the chip 10. This allows for industry standard two qubit entangling operations to be implemented.

The photons now propagate along two parallel waveguides, the "upper" 60 waveguide and the "lower" waveguide 70. Here and below "upper" and "lower" are used only in reference to the appearance of the schematic FIG. 1 and not to a design element. The photons in these waveguides 60 and 70 then enter two parallel MMIs 120. These MMIs 120 effectively control whether or not the entangling operation 130 (contained in the dashed box) is implemented. In the preferred embodiment of the present invention the MMIs 120 can be set to either pass the photons to the entangling operation 130 or to divert them around the entangling operation 130 via bypass lines 140. The preferred embodiment uses bypass lines 140 because the entangling gate 130 chosen for our preferred embodiment is the CZ gate as described by A. Crespi (WO2012150568A1). This is a static operation thus to "turn off" the interaction the photons must be routed around it. The length of the bypass 140 lines is such that they are the same length as the paths in the CZ gate 130 and as such synchronization is maintained. The MMIs 120 are controlled by the off chip electronics 90 via control lines 150. In the preferred embodiment this control is implemented similarly to that of 40. If the MMIs 120 are "on" then both photons enter the CZ gate 130 at the same time and may become entangled. If the switches are "off" the photons remain separable after passing through the "bypass" lines 140. This operation is performed in tandem thus we refer to them as paired. Note that the CZ gate has a success rate of one in nine (⅑) and requires two vacuum modes. Should the CZ gate 130 succeed or the photons be diverted to the bypass lines 140 they will then each enter another MMI. The "upper" MMI 160 will divert the photon into the loop back mode 170. The "lower" MMI 180 will divert its photon into the loop back mode 240. The MMI 160 and 180 are controlled by 90 via logical control line 210. MMI 190 is controlled by 90 via logical control line 220.

The photon in the loopback mode 170 will be delayed in delay line 230. The photon in loopback mode 240 will be delayed in delay line 250. The third (and all subsequent) photons that enter the chip 10 in mode 20 are rotated to the correct input polarization by 30. Delay lines 230 and 250 are carefully fabricated such that the photons they each hold are released at the appropriate time such that the two photons are synchronized similar to the way the first two photons were synchronized. In other words, the two "looped back" photons again reach the pair of MMI's 120 at the same time.

As already described, the present invention features loop backs on both the "upper" and "lower" modes. This allows for shorter meander delay lines which may ease fabrication. Both MMIs 120 as well as MMI 160 and 180 are preferably 2×2 MMIs. The significant additions in the present invention are the first and second loop back modes 170, 240 and corresponding delays 230, 250. The invention operates in the following manner. The first photon in the chain is routed up by MMI 40, then around the CZ gate 130 by MMI 120 and then into the upper loop back mode 170 by MMI 160. The length of this path, particularly the delay 230, is fabricated such that it is a delay of exactly 1 period T of the input. The second (and all subsequent) photon is diverted to the "lower" mode. Due to delay of the first photon both photons are simultaneously incident on the paired MMIs 120. The device proceeds as above.

The procedure to terminate a linear cluster state at a given length is different in this instance. Given that a cluster state has been completed (i.e. every CZ 130 is successful) and there are now two photons on each in MMIs 160 and 180. To extract the last two photons the following steps occur. One photon is "looped" back via one of the loop back modes 170 or 240. The other is channeled to MMI 190 and out of the chip 10 via mode 200. If there are no additional photons sent to the device then MMIs 120, 160 or 180 and 190 can channel the last photon out of the device after delay T. However if the input is an arbitrarily long sequence of photons then when the nth photon reaches MMI 120 the n+1th photon in the sequence will also reach MMI 120 in the other mode. After the bypass mode the two photons will be in MMI 160 and 180. The $n^{th}$ and final photon in the cluster state is diverted to MMI 190 and out of the chip 10 via 200. The other is looped back in the other (currently unused) "loop" back mode 170 or 240. This allows the first chain to exit the device unperturbed and effectively resets the device as the N+1th photon will be synchronized at MMI 120 with the arrival of the n+2nd photon. The n+2nd photon will be diverted into the other mode and the device operation repeats. Thus a second chain can be started without losing any of the input photons.

Having described preferred embodiments of the invention with reference to the accompanying drawing, it is to be understood that the invention is not limited to those precise embodiments, and that various changes and modifications may be effected therein by one skilled in the art without departing from the scope or spirit of the invention as defined in the appended claims.

What is claimed is:

1. An apparatus for sequentially entangling photons, comprising:
   a waveguide chip having integrated optical components and interconnecting optical waveguide disposed therein, wherein said optical components further comprise
   an input port connected to said optical waveguide for inputting said photons into said waveguide chip;
   a polarization controller connected to said input port for rotating the polarization of photons received via said input port;
   a plurality of loop back paths having matched delay lines disposed in each for synchronizing said photons in time;
   a plurality of multimode interferometers for selectably routing said photons through any of said interconnecting optical waveguide;
   a controller for switching the input mode of any of said plurality of multimode interferometers so as to route said photons out of a selected interferometer output port;
   a clock source for synchronizing said controller with the arrival of said photons;
   an entangling gate having bypass and entangling inputs and bypass and entangling outputs for selectively entangling said photons; and
   an output port for routing said entangled photons out of said waveguide chip.

2. The apparatus of claim 1, wherein
   an input of a first of said plurality of multimode interferometers is connected to an output of said polarization controller;
   a first output of said first multimode interferometer is connected to a second input of a second of said plurality of multimode interferometers;
   a second output of said first multimode interferometer is connected to a first input of a third of said plurality of multimode interferometers;
   a first output of said second multimode interferometer is connected to a first bypass input of said entangling gate;
   a second output of said second multimode interferometer is connected to a first entanglement input of said entangling gate;
   a first output of said third multimode interferometer is connected to a first entanglement input of said entangling gate;
   a second output of said third multimode interferometer is connected to a second bypass input of said entangling gate;
   a first input of a fourth of said plurality of multimode interferometers is connected to a first bypass output of said entanglement gate;
   a second input of said fourth multimode interferometer is connected to a first entanglement output of said entanglement gate;
   a first input of a fifth of said plurality of multimode interferometers is connected to a second entanglement output of said entanglement gate;
   a second input of said fifth multimode interferometer is connected to a second bypass output of said entanglement gate;
   a first output of said fourth multimode interferometer is connected to an input of a first of said loopback paths;
   a second output of said fourth multimode interferometer is connected to a first input of a sixth of said plurality of multimode interferometers;
   a first output of said fifth multimode interferometer is connected to a second input of said sixth multimode interferometer;
   a second output of said fifth multimode interferometer is connected to an input of a second of said loopback paths;
   an output of said sixth multimode interferometer is connected to said output port;
   an output of said first loopback path is connected to a first input of said second multimode interferometer; and
   an output of said second loopback path is connected to a second input of said third multimode interferometer.

3. The apparatus of claim 1, wherein said polarization controller rotates the polarization of said photons to a plus state.

4. The apparatus of claim 1, wherein each of said plurality of multimode interferometers comprises a slab of material configured as a multimode mode optical waveguide; and wherein each of said plurality of multimode interferometers further comprises at least one input and at least two outputs; and
   each of said plurality of multimode interferometers being responsive to said controller and so as to selectably connect said at least one input to either of said at least two outputs.

5. The apparatus of claim 1, wherein said delay lines have a length chosen so as to provide a delay through each of said plurality of loopback paths equal to a period of a periodic sequence of photons.

6. The apparatus of claim 1, wherein the delay in time through said entanglement gate from bypass input to bypass output is equivalent to the delay through said entangling gate from entangling input to entangling output.

7. A method or sequentially entangling photons, comprising the steps of:
   inputting photons into a network of interconnected optical waveguides;
   rotating the polarization of said photons to a desired state;
   synchronizing the transit time of said photons through said interconnected optical waveguides by delaying said photons in loopback paths having delay lines disposed therein;
   selectively routing said photons through any of said interconnected optical waveguides using interferometry means, said interferometry means having selectable modes being responsive to electrical commands;
   applying a means for controlling said interferometry modes with electrical commands so as to route said photons out of a selected port of said interferometry means;
   synchronizing said controlling means with the arrival of said photons;
   selectively routing said synchronized photons through an entangling gate having entanglement and bypass modes; and
   selectively entangling said synchronized photons so as to produce entangled photon pairs.

8. The method of claim 7, wherein said step of delaying further comprises the step of delaying said photons in said loopback paths by an amount equal to a period of a periodic sequence of photons.

9. The method of claim 7, wherein said step of rotating the polarization of said photons to a desired state further comprises rotating the polarization of said photons to a plus state.

* * * * *